US011741225B2

(12) United States Patent
Soryal

(10) Patent No.: US 11,741,225 B2
(45) Date of Patent: Aug. 29, 2023

(54) ZERO DAY ATTACK DETECTION

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 110 days.

(21) Appl. No.: 17/105,851

(22) Filed: Nov. 27, 2020

(65) Prior Publication Data
US 2022/0171849 A1 Jun. 2, 2022

(51) Int. Cl.
*G06F 21/55* (2013.01)
*G06F 21/57* (2013.01)
*G06N 20/00* (2019.01)
G06F 9/455 (2018.01)

(52) U.S. Cl.
CPC .......... *G06F 21/554* (2013.01); *G06F 21/577* (2013.01); *G06N 20/00* (2019.01); *G06F 9/45533* (2013.01); *G06F 2221/033* (2013.01)

(58) Field of Classification Search
CPC ................. G06F 21/554; G06F 21/577; G06F 9/45533; G06F 2221/033; G06F 9/455; G06F 11/30; G06N 20/00
See application file for complete search history.

(56) References Cited

U.S. PATENT DOCUMENTS

| | | | | |
|---|---|---|---|---|
| 6,754,751 | B1* | 6/2004 | Willke | G06F 13/4004 710/53 |
| 2001/0051923 | A1* | 12/2001 | Kosuda | G07F 7/1008 705/42 |
| 2017/0364907 | A1* | 12/2017 | Chamberot | G06F 21/83 |
| 2019/0057381 | A1* | 2/2019 | Fenton | G06Q 20/2295 |
| 2020/0090022 | A1* | 3/2020 | Ma | G06N 3/008 |
| 2020/0380335 | A1* | 12/2020 | Neznal | G06N 3/084 |
| 2021/0089643 | A1* | 3/2021 | Moran | G06F 21/566 |
| 2021/0157945 | A1* | 5/2021 | Cobb | H04L 63/102 |

* cited by examiner

*Primary Examiner* — Meng Li
(74) *Attorney, Agent, or Firm* — Hartman & Citrin LLC

(57) ABSTRACT

The concepts and technologies disclosed herein are directed to zero day attack detection. A system can monitor, by a sequence manager, a sequence of transaction requests. The sequence manager can determine whether a transaction request in the sequence is anomalous. In response to determining that the transaction request is anomalous, and before the allowing the system to process the transaction request, the sequence manager can provide the sequence of transaction requests to a sequence emulator. The sequence emulator can attempt to verify an output of the sequence of transaction requests. The sequence manager can receive a notification from the sequence emulator. The notification can indicate whether the output of the sequence of transaction requests can be verified. In response, the sequence manager can instruct the system to deny (if the output cannot be verified) or allow (if the output can be verified) processing of the sequence of transaction requests.

20 Claims, 13 Drawing Sheets

ZERO DAY ATTACK DETECTION

BACKGROUND

In cybersecurity, a vulnerability is a flaw in a software, firmware, hardware, or service component resulting from a weakness that can be exploited to negatively impact the confidentiality, integrity, or availability of the impacted component(s). A zero day attack exploits an unknown vulnerability for the first time. Since the vulnerability is unknown, no vulnerability signature or behavior exists to enable accurate detection of the attack. Some systems aim to limit zero day attack impacts by whitelisting actions that provide some, but not full, protection, and become useless against sophisticated attacks.

SUMMARY

Concepts and technologies disclosed herein are directed to aspects of zero day attack detection. According to one aspect of the concepts and technologies disclosed herein, a system can include a processor and a memory. The memory can store instructions that, when executed by the processor, cause the processor, and thereby the system, to perform operations. In particular, the system can monitor, by a sequence manager, a sequence of transaction requests. The sequence of transaction requests can include a plurality of software transaction requests, hardware transaction requests, and/or firmware transaction requests. The sequence manager can determine whether a transaction request in the sequence is anomalous. In response to determining that the transaction request is anomalous, and before the allowing the system to process the transaction request, the sequence manager can provide the sequence of transaction requests to a sequence emulator. The sequence emulator can attempt to verify an output of the sequence of transaction requests. The sequence manager can receive a notification from the sequence emulator. The notification can indicate whether the output of the sequence of transaction requests can be verified. In response, the sequence manager can instruct the system to deny (if the output cannot be verified) or allow (if the output can be verified) processing of the sequence of transaction requests.

In some embodiments, the sequence manager can update a database to include the sequence of transaction requests. The sequence of transaction requests can be associated with a label indicating whether the sequence of transaction requests is associated with a vulnerability. The sequence of transaction requests can be determined to be associated with a vulnerability if the output of the sequence emulator cannot be verified. The database can be a local database stored on the system. Additionally or alternatively, the database can be a remote database. In some embodiments, the remote database is associated with a verification server. The verification server can collect sequences from a plurality of systems, including the system. The verification server can update local databases, such as the local database stored on the system, to ensure that the most up-to-date information about potential good (i.e., verifiable) and bad (i.e., not verifiable) sequences is stored. In some embodiments, the verification server is utilized by a manufacturer of the system to inform other systems manufactured by the manufacturer of good and bad sequences.

In some embodiments, the sequence manager can monitor the sequence of transaction requests via one or more probes. The probe(s) can be implemented by a hardware probe and/or a software probe (e.g., implemented as a microservice). In some embodiments, one or more components of the system can duplicate signals associated with transaction requests so that one copy of the signal(s) is sent to the sequence manager to correlate the signal(s) received from the probe(s).

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
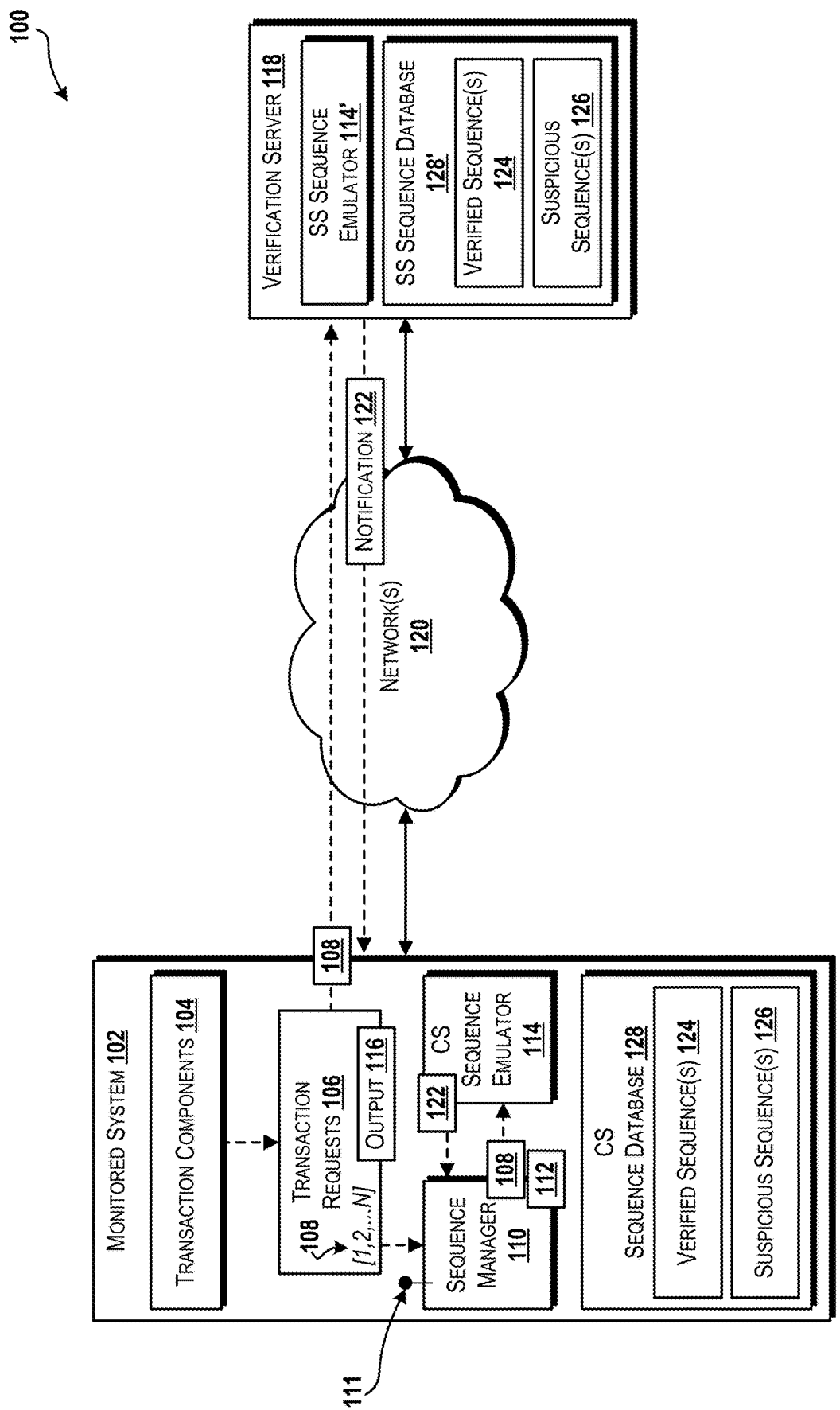
FIG. 1 is a diagram illustrating aspects of an illustrative operating environment in which various concepts and technologies disclosed herein can be implemented.

Turning now to FIG. 1, an illustrative operating environment 100 in which embodiments of various concepts and technologies disclosed herein can be implemented will be described. The concepts and technologies disclosed herein provide a monitored system 102 that includes one or more transaction components 104 (referred to collectively as "transaction components 104" or individually as "transaction component 104") that are capable of generating, sending, receiving, and/or processing one or more transaction requests 106. The monitored system 102 can be or can include, for example, a personal computer, a server, a smartphone, a vehicle (i.e., human-driven and/or at least partially autonomous), a set-top box, a video game system, a networking device (e.g., modem, router, or switch), a network element or function, mechanical system or device, electrical system or device, or the like. The transaction components 104 can be or can include one or more hardware components such as, for example, a processor, a memory, a network interface, an input and/or output interface, a subsystem of the monitored system 102, or the like. The transaction components 104 can be or can include one or more software components such as, for example, a software application executed by the monitored system 102. The transaction components 104 can be or can include one or more firmware components such as, for example, a firmware of the monitored system 102. The transaction components 104 can include any combination of hardware, software, and/or firmware. The transaction requests 106 can include any combination of one or more software transaction requests, one or more hardware transaction requests, and/or one or more firmware transaction requests.

The transaction requests 106 can form one or more sequences 108 (referred to collectively as "sequences 108" or individually as "sequence 108"). A sequence manager 110, executed by the monitored system 102 as shown or remotely (not shown), can monitor (e.g., via one or more hardware and/or software probes 111) the transaction requests 106 in the sequences 108 for any anomalous transaction requests 112 and can quarantine (i.e., prevent the monitored system 102 from processing) any sequence 108 that contains one or more anomalous transaction requests 112 until a sequence emulator 114 (implemented as a client-side "CS" sequence emulator 114 and/or a server-side "SS" sequence emulator 114') can verify an output 116 of the sequence 108. It is contemplated that the monitored system 102 may offload some or all sequence emulation to the SS sequence emulator 114' due to processing and/or other constraints of the monitored system 102 or as a matter of choice. The SS sequence emulator 114' is shown as part of a verification server 118. The monitored system 102 can communicate with the verification server 118 via one or more networks 120. For example, the monitored system 102 can provide the sequences 108 to the verification server 118 for emulation by the SS sequence emulator 114'.

The sequence emulator 114 (e.g., a software simulator) emulates each of the transaction components 104 and transaction flows within the monitored system 102 as software elements. By way of example, and not limitation, consider the monitored system 102 as an electric motor that operates a fan. The sequence emulator 114 can emulate each component of the system, including the power input, motor, and fan. If an operator wants to increase the voltage input from 50 volts to 100 volts, the sequence emulator 114 can emulate a transaction flow (e.g., in which a transaction request includes the request for increased voltage) before allowing the monitored system 102 to perform that action. To verify whether the increase of voltage from 50 volts to 100 volts is acceptable, the sequence emulator 114 can simulate the flow based on prior parameters and may find, for example, that the motor can handle the additional voltage, but the fan speed will increase such that the fan is damaged (e.g., due to a maximum rotations per second of 90 versus 120 rotations per second achieved at the higher voltage). For this reason, the sequence emulator 114 can inform the sequence manager 110 to deny the transaction request 106 associated with increasing the voltage from 50 volts to 100 volts.

The sequence emulator 114 can attempt to verify the output 116 of the sequence 108 and can notify the sequence manager 110, via a notification 122, of whether the output 116 of the sequence 108 can be verified. In response, the sequence manager 110 can instruct the monitored system 102 to deny (if the output 116 cannot be verified) or allow (if the output 116 can be verified) processing of the sequence 108. The sequence manager 110 and/or the sequence emulator 114 can cause one or more verified sequences 124 and/or one or more suspicious sequences 126 to be stored in a sequence database 128 (implemented as a CS sequence database 128 and/or SS sequence database 128').

Figure 2:
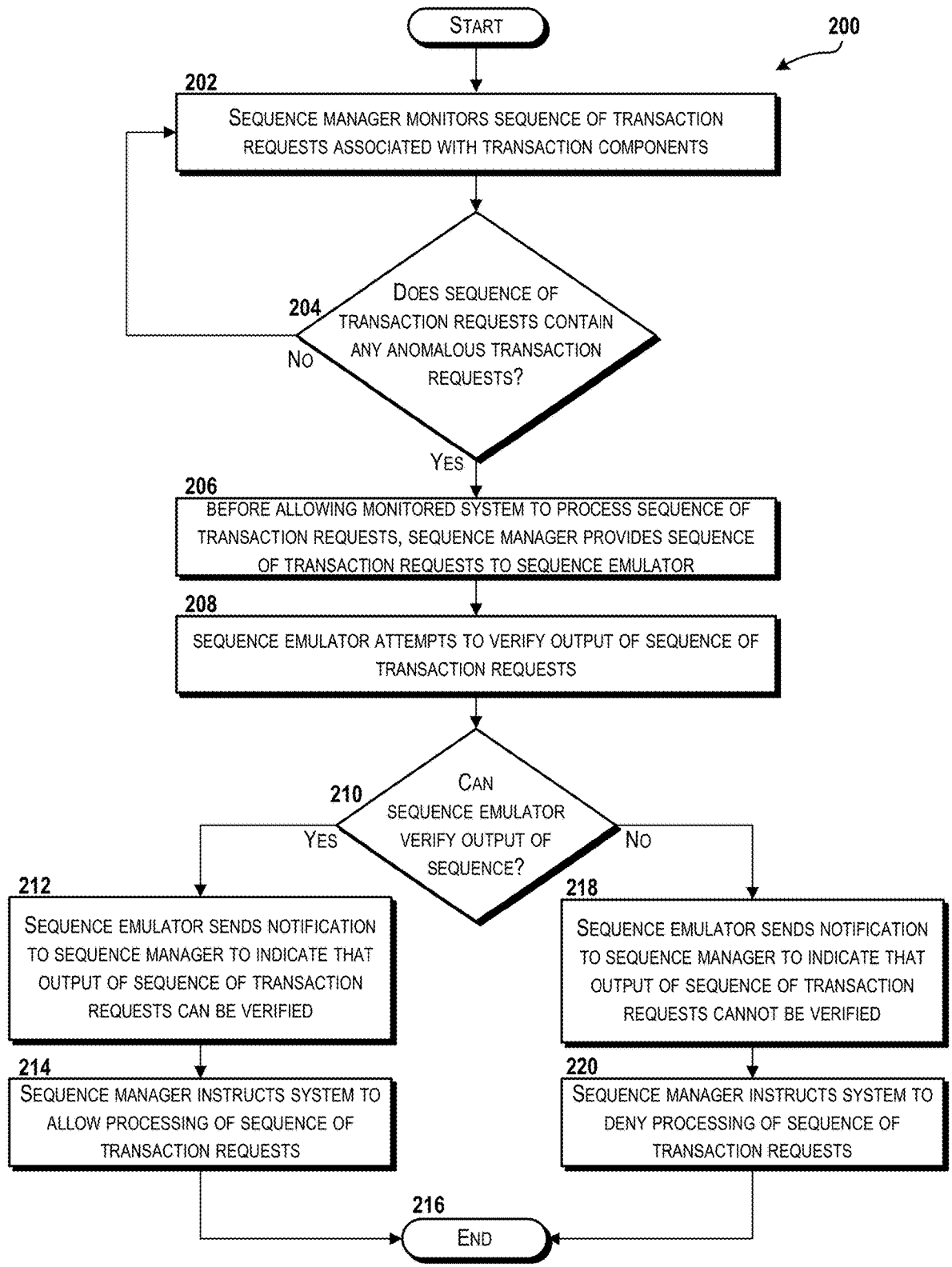
FIG. 2 is a flow diagram illustrating aspects of a method for zero day attack detection, according to an illustrative embodiment of the concepts and technologies disclosed herein.

Turning now to FIG. 2, a flow diagram illustrating aspects of a method 200 for zero day attack detection will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the monitored system 102 and/or the verification server 118 to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the sequence manager 110 monitors the sequence 108 of transaction requests 106 associated with the transaction components 104. In some embodiments, the sequence manager 110 includes or is in communication with one or more probes. The probes can be hardware, software, or a combination of hardware and software.

From operation 202, the method 200 proceeds to operation 204. At operation 204, the sequence manager 110 determines whether the sequence 108 of transaction requests 106 contains any anomalous transaction requests. In some embodiments, the sequence manager 110 can monitor the output of the probe(s) to determine if the sequence 108 of transaction requests 106 contains any anomalous transaction requests. If the sequence manager 110 determines that the sequence 108 of transaction requests 106 does not contain any anomalous transaction requests, the method 200 returns operation 202, and the sequence manager 110 continues to monitor the sequence 108 of transaction requests 106. If, however, the sequence manager 110 determines that the sequence 108 of transaction requests 106 contains at least one anomalous transaction request, the method 200 proceeds to operation 206.

At operation 206 and before allowing the monitored system 102 to process the sequence 108 of transaction requests 106, the sequence manager 110 provides the sequence 108 of transaction requests 106 to the sequence emulator 114. The sequence emulator 114 can be part of or separate from the sequence manager 110. In some embodiments, the sequence emulator 114 operates on the monitored system 102 (i.e., as the client-side sequence emulator 114). In other embodiments, the sequence emulator 114 operates on a remote system such as the verification server (i.e., as the server-side sequence emulator 114').

From operation 206, the method 200 proceeds to operation 208. At operation 208, the sequence emulator 114 attempts to verify the output of the sequence 108 of transaction requests 106. From operation 208, the method 200 proceeds to operation 210. At operation 210, the sequence emulator 114 determines if the output 116 of the sequence 108 of transaction requests can be verified. If the sequence emulator 114 can verify the output 116 of the sequence 108 of the transaction requests, the method 200 proceeds to operation 212. At operation 212, the sequence emulator 114 sends the notification to the sequence manager 110 to indicate that the output of the sequence 108 of transaction requests 106 can be verified. From operation 212, the method 200 proceeds to operation 214. At operation 214, the sequence manager 110 instructs the monitored system 102 to allow processing of the sequence 108 of transaction requests 106. From operation 214, the method 200 proceeds to operation 216. The method 200 can end at operation 216. Returning to operation 210, if the sequence emulator 114 cannot verify the output of the sequence 108 of transaction requests 106, the method 200 proceeds to operation 218. At operation 218, the sequence emulator 114 sends the notification to the sequence manager 110 to indicate that the output of the sequence 108 of transaction requests 106 cannot be verified. From operation 218, the method 200 proceeds to operation 220. At operation 220, the sequence manager 110 instructs the monitored system 102 to deny processing of the sequence 108 of transaction requests 106. From operation 220, the method 200 proceeds to operation 216. The method 200 can end at operation 216.

Figure 3:
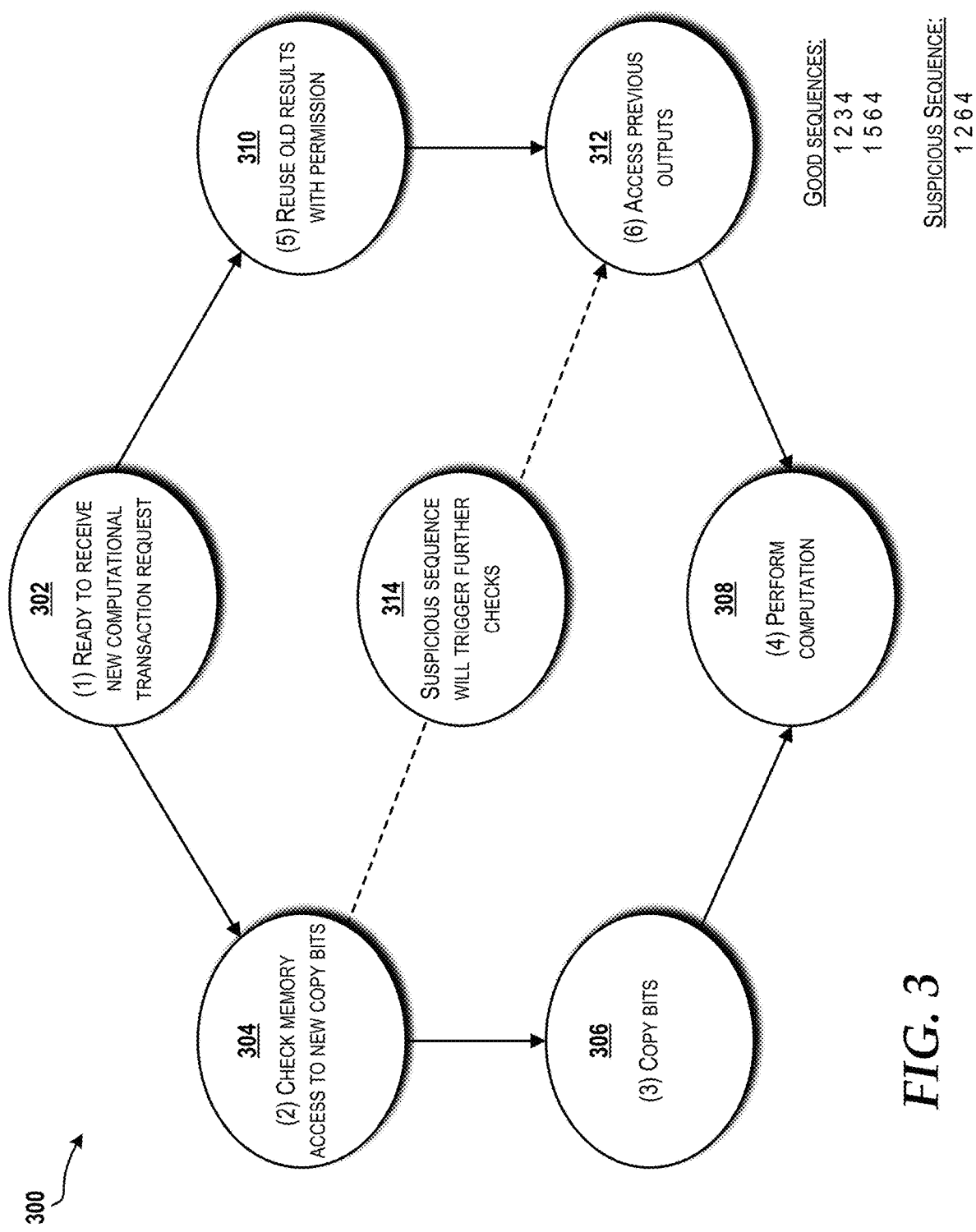
FIG. 3 is a diagram illustrating an example use case of a processor transaction sequence, according to an illustrative embodiment of the concepts and technologies disclosed herein.

Turning now to FIG. 3, a diagram illustrating an example use case of a processor transaction sequence 300 will be described, according to an illustrative embodiment of the concepts and technologies disclosed herein. The processor transaction sequence 300 will be described from the perspective of a processor of the monitored system 102. Examples of such a processor can be found in FIG. 7 (processing unit 702), FIG. 9 (compute resources 908), and FIG. 11 (processor 1104). These examples should not be construed as being limiting in any way. Moreover, the processor transaction sequence 300 is described in context of the monitored system 102 being attacked by exploiting vulnerabilities in the way modern processors execute instructions. Two well-known vulnerabilities are Spectre and Meltdown. Since these vulnerabilities are now known, the concepts and technologies disclosed herein to detect zero day attacks, are not directly applicable. Those skilled in the art, however, will understand the benefit of the concepts and technologies disclosed herein to detect other vulnerabilities that are not yet known.

The processor transaction sequence 300 includes steps/transactions (1) through (6), labeled 302, 304, 306, 308, 310, 312, respectively. A good sequence is a sequence that does not include any anomalous step(s)/transaction(s). A bad or suspicious sequence is a sequence that does include one or more anomalous step(s)/transaction(s). In the illustrated example, step (1) to step (2) to step (3) to step (4) represents a good sequence, as does step (1) to step (5) to step (6) to step (4). A suspicious sequence of step (1) to step (2) to step (6) to step (4) is also shown in the illustrated example. As a result, further checks may be required, as represented at 314.

At 302, the processor transaction sequence 300 begins and the processor is ready to receive a new computational transaction request. At 304, the processor checks memory access to new copy bits. At 306, the processor copies bits, and at 308, the processor performs a computation. This represents the first good sequence described above. The second good sequence starts again at 302 and the processor is ready to receive a new computational transaction request. The sequence proceeds to 310 where the processor can reuse old results with permission. At 312, the processor accesses previous outputs before performing a computation at 308.

The suspicious sequence begins the same as the two good sequences. That is, at 302, the processor is ready to receive a new computational transaction request. At 304, the processor checks memory access to new copy bits. Instead of proceeding to 306 and copying bits, the suspicious sequence proceeds directly to 312 to access previous outputs. This is suspicious because access to previous outputs must come after 310 where the processor reuses old results with permission. Accordingly, the sequence manager 110 can trigger further checks at 314.

Figure 4:
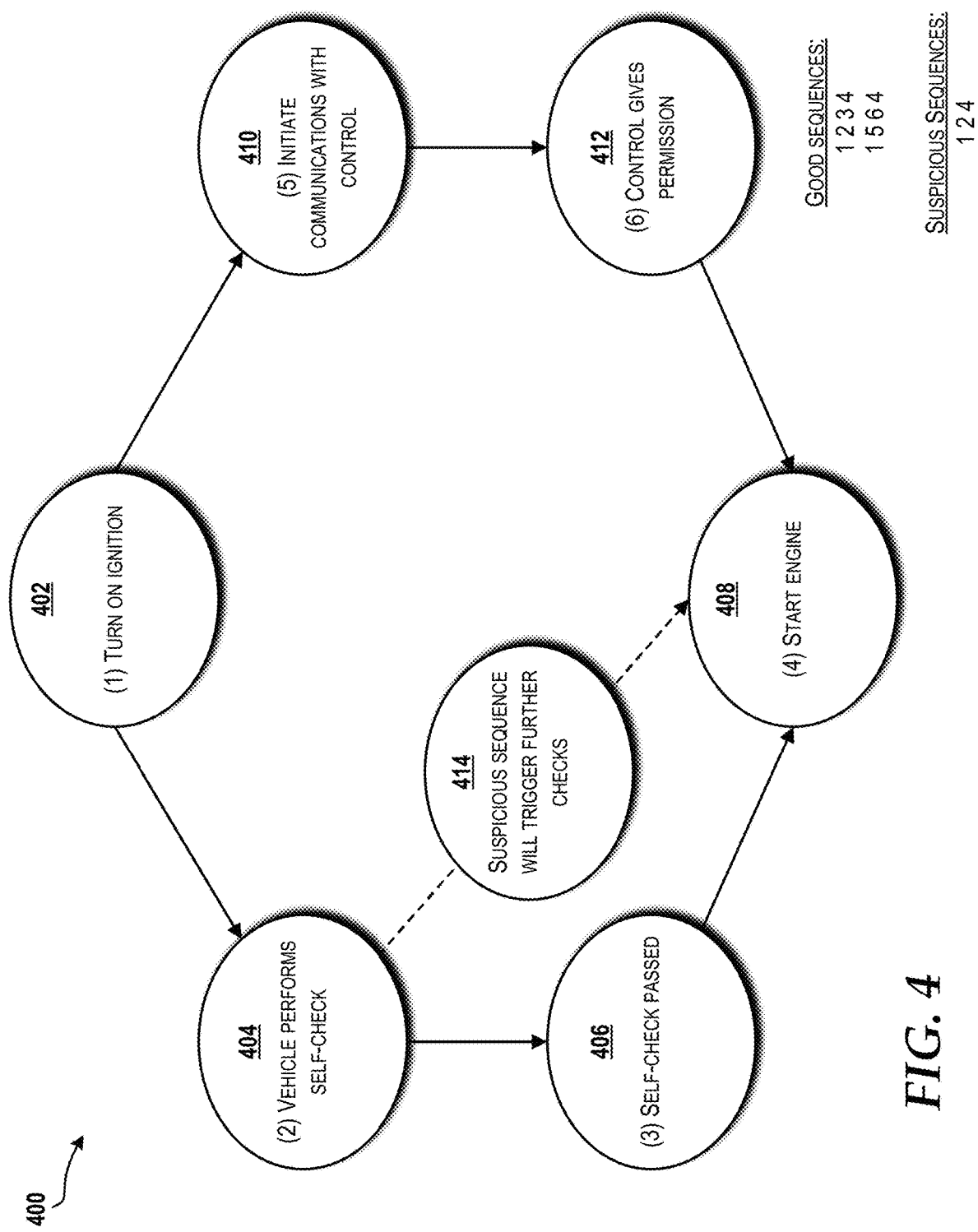
FIG. 4 is a diagram illustrating an example use case of a vehicle transaction sequence, according to an illustrative embodiment of the concepts and technologies disclosed herein.

Turning now to FIG. 4, a diagram illustrating an example use case of a vehicle transaction sequence 400 will be described, according to an illustrative embodiment of the concepts and technologies disclosed herein. The vehicle transaction sequence 400 will be described from the perspective of a vehicle. The steps may be performed by one or more systems or sub-systems of a vehicle. For ease of explanation, however, the steps will be described as being performed by the vehicle as a whole. Those skilled in the art will appreciate the systems, sub-systems, or combinations thereof that may participate in the foregoing steps.

The vehicle transaction sequence 400 includes steps/transactions (1) through (6), labeled 402, 404, 406, 408, 410, 412, respectively. A good sequence is a sequence that does not include any anomalous step(s)/transaction(s). A bad or suspicious sequence is a sequence that does include one or more anomalous step(s)/transaction(s). In the illustrated example, step (1) to step (2) to step (3) to step (4) represents a good sequence, as does step (1) to step (5) to step (6) to step (4). A suspicious sequence of step (1) to step (2) to step (4) is also shown in the illustrated example. As a result, further checks may be required, as represented at 414.

At 402, the vehicle transaction sequence 400 begins and the vehicle ignition is turned to the ON position. At 404, the vehicle performs one or more self-checks. At 406, the vehicle passes the self-check(s), which allows the engine to be started at 408. This represents the first good sequence described above. The second good sequence starts again at 402 and the vehicle ignition is turned to the ON position. The sequence proceeds to 410 where the vehicle initiates communications with control. The control represents either a local or remote system that can give permission to the vehicle to start the engine without performing any self-checks. This may be useful in implementations of the vehicle as a smart or connected vehicle, including fully and partially autonomous vehicles. At 412, the control gives permission and the vehicle starts the engine.

The suspicious sequence begins the same as the two good sequences. That is, at 402, the vehicle ignition is turned to the ON position. At 404, the vehicle performs one or more self-checks. Instead of proceeding to 406, the vehicle starts the engine at 408. This is suspicious because the vehicle never completes the self-check to obtain a pass/fail result. Accordingly, the sequence manager 110 can trigger further checks at 414.

Figure 5A:
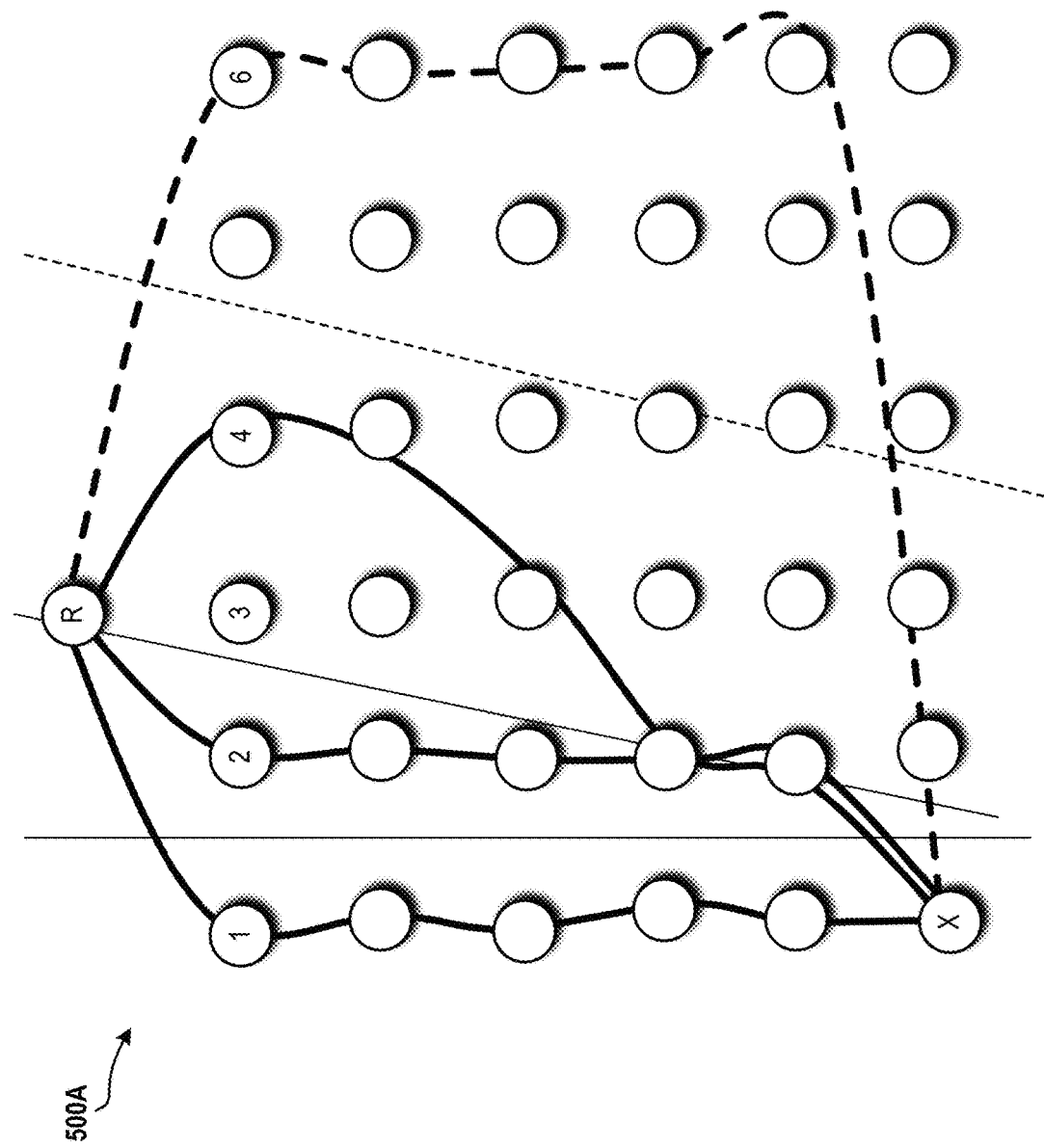
FIGS. 5A-5C are diagrams illustrating an example machine learning tree structure that can be used to detect anomalies, according to an illustrative embodiment of the concepts and technologies disclosed herein.
Figure 5B:
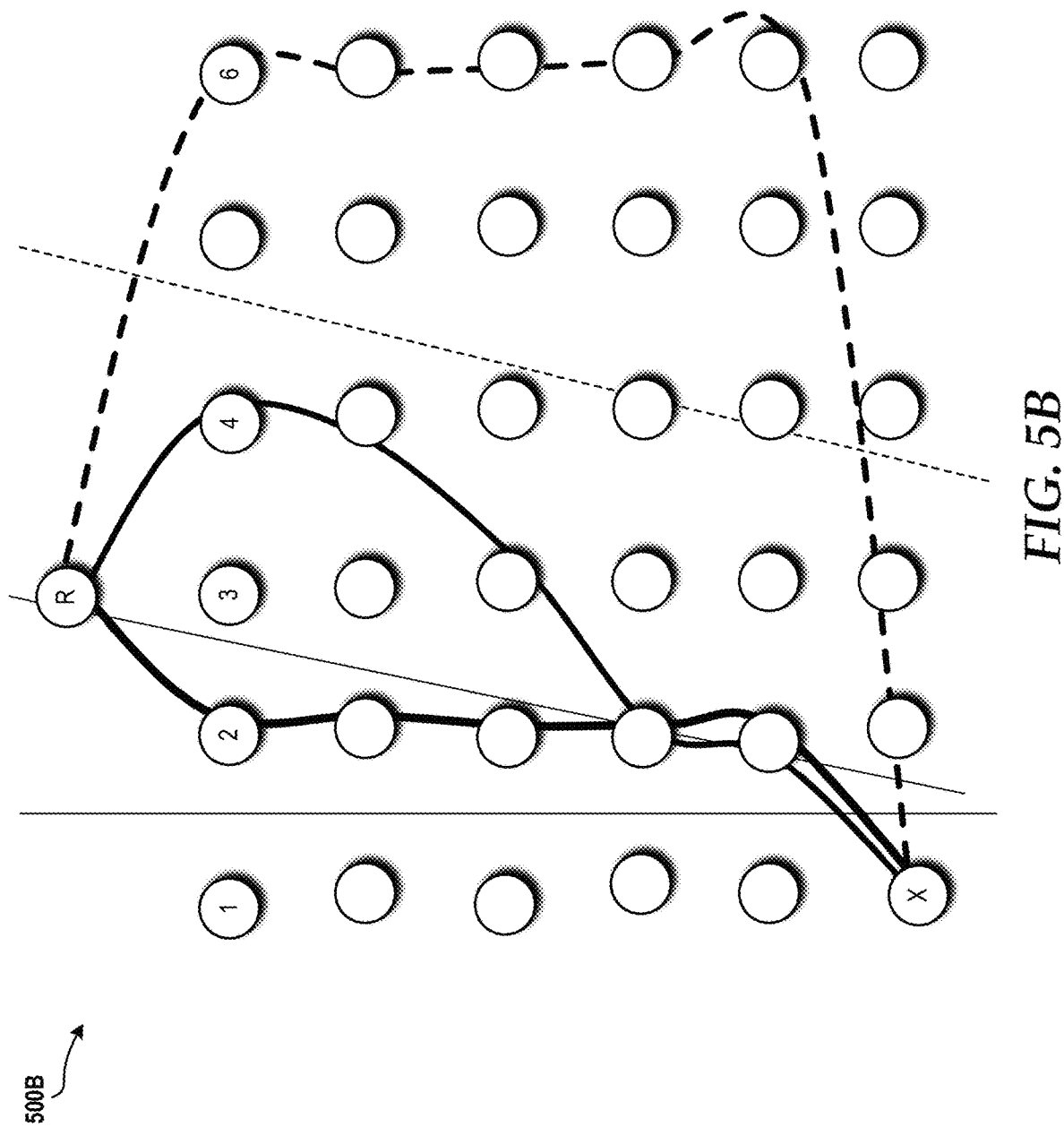
Figure 5C:
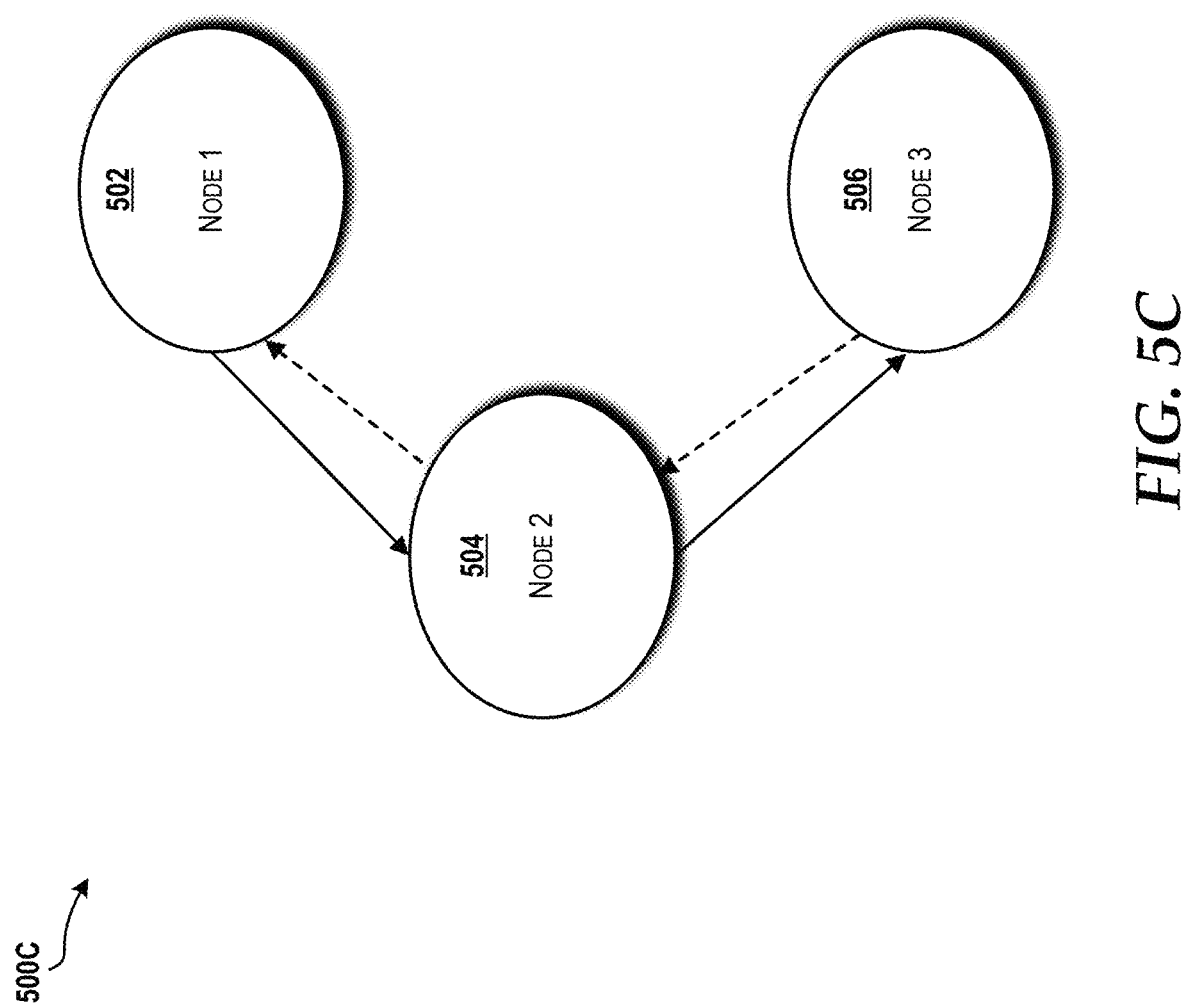

Turning now to FIGS. 5A-5C, diagrams illustrating example machine learning tree structures 500A-500C that can be used to detect anomalies will be described, according to an illustrative embodiment of the concepts and technologies disclosed herein. The sequence manager 110 can analyze known sequences that are exceptionally long or short for the same "destination" transaction. For example, most sequences to send an email may have an average of n transactions inside the monitored system 102 (e.g., embodied as a computer capable of sending an email). 2n or 0.5n transactions to send an email can be considered an anomaly and subject to further analysis. The sequence manager 110 can also track how many transactions are needed to reach certain destinations among different users and for the same user under different circumstances. For example, brake activation in a vehicle may result in a different number of sequences for each user and for the entire population under different circumstances.

Turning first to FIG. 5A, the machine learning tree structure 500A shows a root transaction ("R") that leads into four different paths towards an end/destination transaction ("X"). Paths represented with a solid line are viable/normal paths (i.e., R-1-X, R-2-X, and R-4-X). The path R-9-X with dotted line is suspicious. FIG. 5B shows transaction correlation for the same destination transaction. That is, starting from the same root transaction, the number of transactions that were similar along respective paths can be determined. In the illustrated example, the machine learning tree structure 500B shows two solid paths (i.e., R-2-X and R-4-X) that have some correlation, whereas the dotted path (i.e., R-6-X) has zero correlation, which seems suspicious and could be indicative of an attack.

The sequence manager 110 can perform analysis on significantly curved branches (e.g., R-6-X in both FIGS. 5A and 5B) of the machine learning tree structure 500A. The sequence manager 110 can visualize and plot the transaction requests 106 and the sequences 108 to be computer readable. Each area can utilize two different paths. This method can be used when a good baseline of different areas has been established. For example, a manufacturer can help determine a good baseline by collecting results of multiple sequences 108 such that deviation from the baseline can be representative of suspicious activity. In the illustrated example, the path R-1-X is the most used and is used by the sequence manager 110 as a reference in calculating Area 1 between two paths. In FIG. 5A, the sequence manager 110 can calculate Area 1 as the area contained within the boundaries of R-1-X-2-R. Similarly, the sequence manager 110 can calculate the Area 2 as the area contained within the boundaries of R-2-X-4-R. Over time, the sequence manager 110 can calculate an average of these areas. In the illustrated example, after some time, a hacker tries to reach X from R via 6, so the sequence manager 110 calculates the average R-4-X-6-R. Since path R-4-X was deemed acceptable, the new path R-6-X can be labeled suspicious because it has a larger area. A larger area means that the hacker had to go to normally unused steps/processes/backdoors to reach the required target. Each area within the average clears two different paths to be potentially safe. Significant deviation from the average that would be at least 1.5-2 times the average.

FIG. 5C shows transaction flows running in opposite directions in the machine learning structure 500C. If the majority of transactions flow from node 1 502 to node 2 504 to node 3 506, but some transactions flow from node 3 506 to node 2 504 to node 1 502, the transaction sequence can be flagged for further analysis. More than two reversed directions for nodes can be weighted heavier than one or two reversals.

Figure 6:
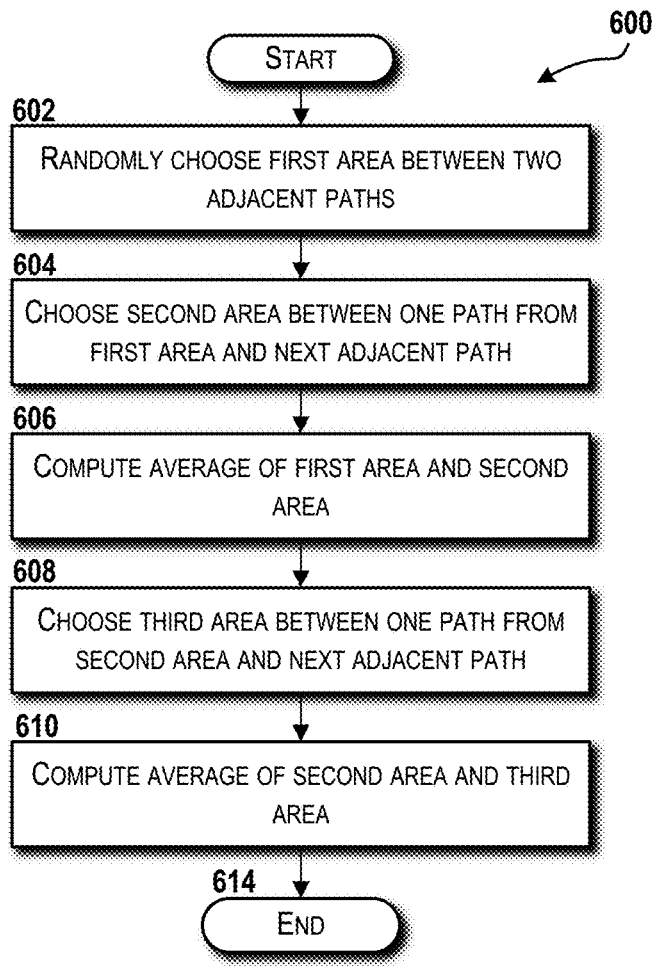
FIG. 6 is a flow diagram illustrating aspects of a method for analyzing a machine learning tree structure to detect one or more anomalies in a sequence of transaction requests, according to an illustrative embodiment of the concepts and technologies disclosed herein.

Turning now to FIG. 6, a flow diagram illustrating aspects of a method 600 for analyzing a machine learning tree structure, such as one of the machine learning tree structures 500A-500C described above, to detect one or more anomalies in a sequence of transaction requests will be described, according to an illustrative embodiment of the concepts and technologies disclosed herein. The method 600 begins and proceeds to operation 602. At operation 602, the sequence manager 110 randomly chooses a first area between two adjacent paths, such as path 1 and path 2 in FIG. 5A. From operation 602, the method 600 proceeds to operation 604. At operation 604, the sequence manager 110 chooses a second area between one path from the first area and the next adjacent path. From operation 604, the method 600 proceeds to operation 606. At operation 606, the sequence manager 110 computes an average of the first area and the second area.

From operation 606, the method 600 proceeds to operation 608. At operation 608, the sequence manager 110 chooses a third area between one path from the second area and the next adjacent path. From operation 608, the method 600 proceeds to operation 610. At operation 610, the sequence manager 110 computes the average of the second area and the third area. This process continues until the average is significant and the path is flagged as suspicious. From operation 610, the method 600 proceeds to operation 614. The method 600 ends at operation 614.

Figure 7:
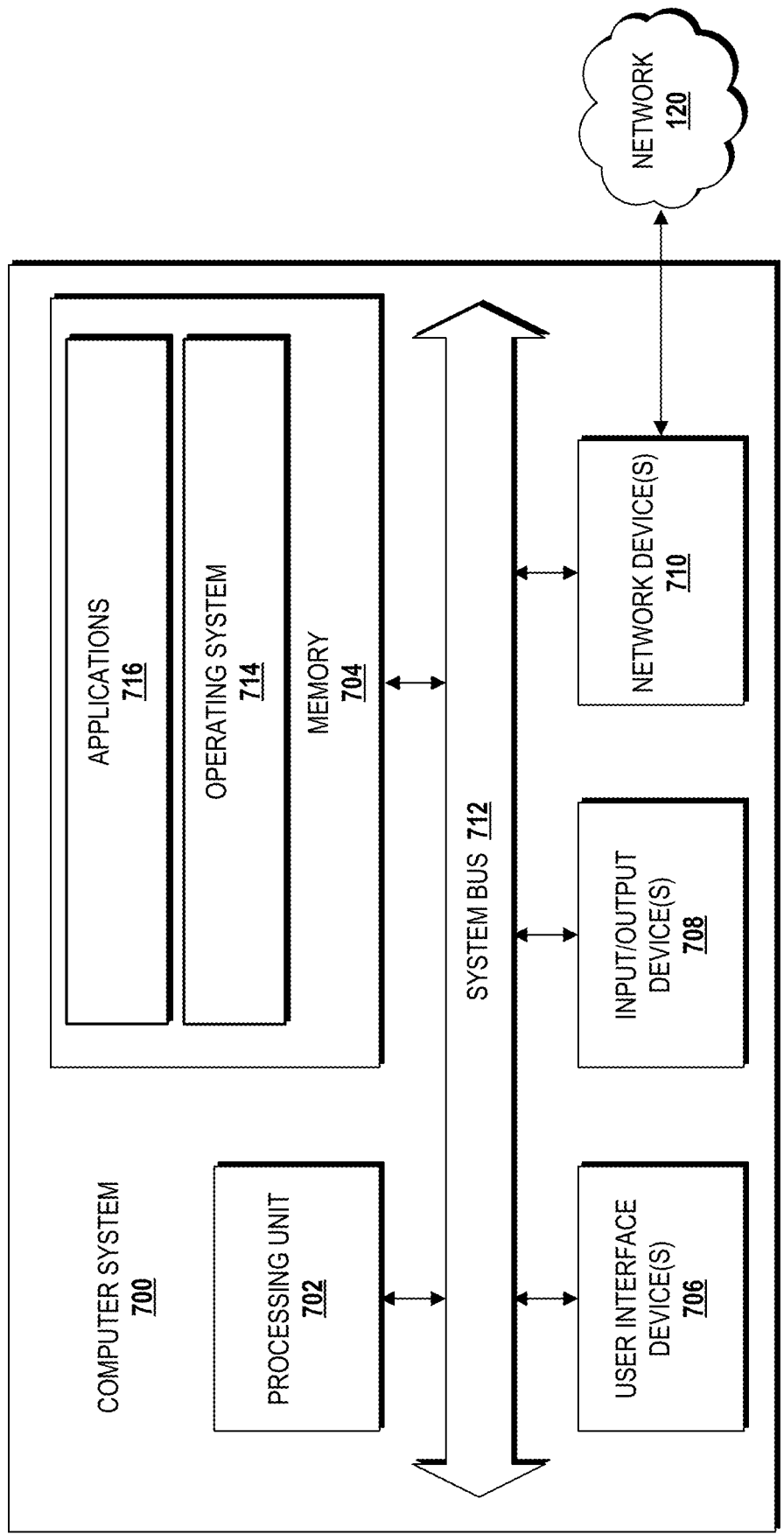
FIG. 7 is a diagram illustrating an illustrative computer system capable of implementing aspects of the concepts and technologies disclosed herein.

Turning now to FIG. 7, a block diagram illustrating a computer system 700 configured to provide the functionality described herein in accordance with various embodiments of the concepts and technologies disclosed herein will be described. In some embodiments, the monitored system 102, the verification server 118, one or more components thereof, and/or other systems/platforms/devices/elements disclosed herein can be configured like and/or can have an architecture similar or identical to the computer system 700 described herein with respect to FIG. 7. It should be understood, however, that any of these systems, devices, platforms, or elements may or may not include the functionality described herein with reference to FIG. 7.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 716 can include various software, program modules, and/or databases described herein. For example, the program modules 716 can include the sequence manager 110, the sequence emulator 114, and/or the sequence database 128. The memory 704 also can store the transaction requests 106, the output 116, the verified sequence(s) 124, the suspicious sequences 126, the anomalous transaction request(s) 112, the notifications 122, and/or other data described herein.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium," "computer-readable storage medium," and variations thereof does not include waves or signals per se and/or communication media, and therefore should be construed as being directed to "non-transitory" media only.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer to output data.

Figure 8:
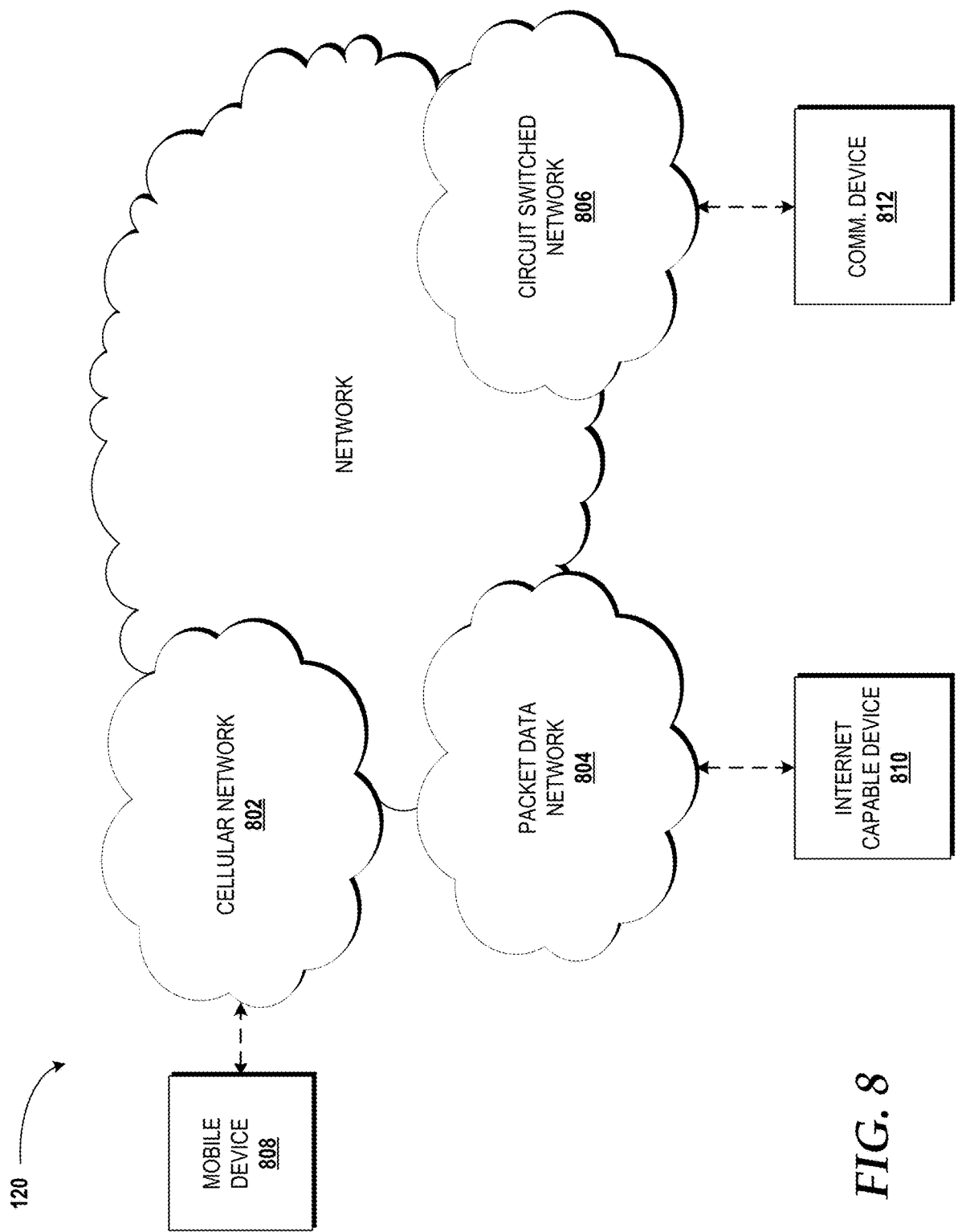
FIG. 8 is a diagram illustrating an illustrative network capable of implementing aspects of the concepts and technologies disclosed herein.

The network devices 710 enable the computer system 700 to communicate with other networks or remote systems via one or more networks, such as the network(s) 120 (best shown in FIGS. 1 and 8). Examples of the network devices 710 include, but are not limited to, a modem, an RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a Wireless Metropolitan Area Network ("WMAN") such as a World-wide Interoperability for Microwave Access ("WiMAX") network, or a cellular network. Alternatively, the network(s) may be a wired network such as, but not limited to, a WAN such as the Internet, a LAN, a wired PAN, or a wired MAN.

Turning now to FIG. 8, additional details of an embodiment of the network 120 will be described, according to an illustrative embodiment. In the illustrated embodiment, the network 120 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), HSSs, visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. In some embodiments, the mobile communications device 808 can be or can include the monitored system 102 or the verification server 118. The cellular network 802 can be configured to utilize any using any wireless communications technology or combination of wireless communications technologies, some examples of which include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The mobile communications device 808 can communicate with the cellular network 802 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the mobile communications device 808 and the cellular network 802 via cellular data technologies such as, but not limited to, GPRS, EDGE, the HSPA protocol family including General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, 5G technologies, and/or various other current and future wireless data access technologies. It should be understood that the cellular network 802 may additionally include backbone infrastructure that operates on wired communications technologies, including, but not limited to, optical fiber, coaxial cable, twisted pair cable, and the like to transfer data between various systems operating on or in communication with the cellular network 802.

The packet data network 804 can include various systems/platforms/devices, such as, for example, the monitored system 102, the verification server 118, one or more components thereof, servers, computers, databases, and other systems/platforms/devices, in communication with one another. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet.

The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable systems/devices 810, for example, the monitored system 102, the verification server 118, one or more components thereof, a personal computer ("PC"), a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. It should be appreciated that substantially all of the functionality described with reference to the network 120 can be performed by the cellular network 802, the packet data network 804, and/or the circuit switched network 806, alone or in combination with additional and/or alternative networks, network elements, and the like.

Figure 9:
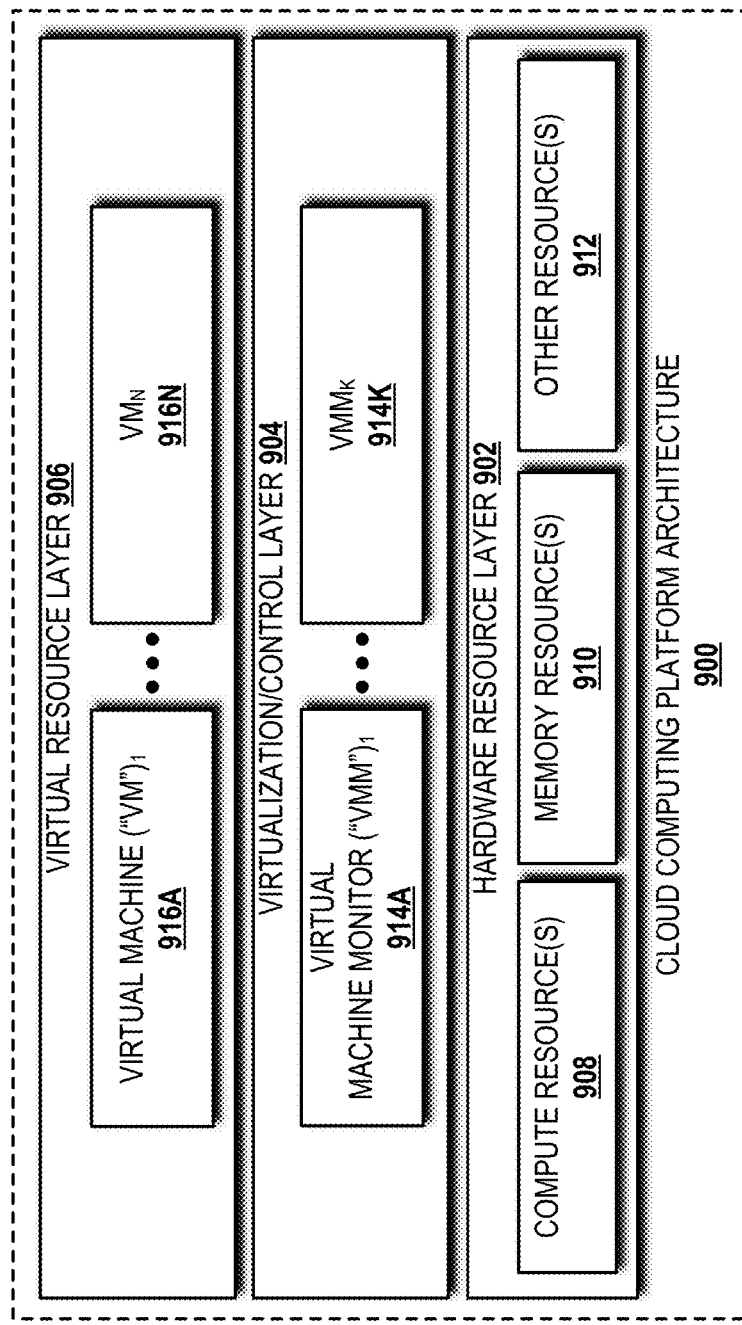
FIG. 9 is a diagram illustrating an illustrative cloud computing platform architecture capable of implementing aspects of the concepts and technologies disclosed herein.

Turning now to FIG. 9, a cloud computing platform architecture 900 capable of implementing aspects of the concepts and technologies disclosed herein will be described, according to an illustrative embodiment. In some embodiments, the monitored system 102, the verification server 118, one or more components thereof, can be implemented, at least in part, on the cloud computing platform architecture 900. Those skilled in the art will appreciate that the illustrated cloud computing platform architecture 900 is a simplification of but one possible implementation of an illustrative cloud computing platform, and as such, the cloud computing platform architecture 900 should not be construed as limiting in any way.

The illustrated cloud computing platform architecture 900 includes a hardware resource layer 902, a virtualization/control layer 904, and a virtual resource layer 906 that work together to perform operations as will be described in detail herein. While connections are shown between some of the components illustrated in FIG. 9, it should be understood that some, none, or all of the components illustrated in FIG. 9 can be configured to interact with one other to carry out various functions described herein. In some embodiments, the components are arranged so as to communicate via one or more networks (not shown). Thus, it should be understood that FIG. 9 and the following description are intended to provide a general understanding of a suitable environment in which various aspects of embodiments can be implemented, and should not be construed as being limiting in any way.

The hardware resource layer 902 provides hardware resources, which, in the illustrated embodiment, include one or more compute resources 908, one or more memory resources 910, and one or more other resources 912. The compute resource(s) 906 can include one or more hardware components that perform computations to process data, and/or to execute computer-executable instructions of one or more application programs, operating systems, and/or other software. The compute resources 908 can include one or more central processing units ("CPUs") configured with one or more processing cores. The compute resources 908 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 908 can include one or more discrete GPUs. In some other embodiments, the compute resources 908 can include CPU and GPU components that are configured in accordance with a co-processing CPU/GPU computing model, wherein the sequential part of an application executes on the CPU and the computationally-intensive part is accelerated by the GPU. The compute resources 908 can include one or more system-on-chip ("SoC") components along with one or more other components, including, for example, one or more of the memory resources 910, and/or one or more of the other resources 912. In some embodiments, the compute resources 908 can be or can include one or more SNAPDRAGON SoCs, available from QUAL-COMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 908 can be or can include one or more hardware components architected in accordance with an ARM architecture, available for license from ARM HOLDINGS of Cambridge, United Kingdom. Alternatively, the compute resources 908 can be or can include one or more hardware components architected in accordance with an x86 architecture, such an architecture available from INTEL CORPORATION of Mountain View, Calif., and others. Those skilled in the art will appreciate the implementation of the compute resources 908 can utilize various computation architectures, and as such, the compute resources 908 should not be construed as being limited to any particular computation architecture or combination of computation architectures, including those explicitly disclosed herein.

The memory resource(s) 910 can include one or more hardware components that perform storage operations, including temporary or permanent storage operations. In some embodiments, the memory resource(s) 910 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 908.

The other resource(s) 912 can include any other hardware resources that can be utilized by the compute resources(s) 906 and/or the memory resource(s) 910 to perform operations. The other resource(s) 912 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 902 can be virtualized by one or more virtual machine monitors ("VMMs") 914A-914K (also known as "hypervisors;" hereinafter "VMMs 914") operating within the virtualization/control layer 904 to manage one or more virtual resources that reside in the virtual resource layer 906. The VMMs 914 can be or can include software, firmware, and/or hardware that alone or in combination with other software, firmware, and/or hardware, manages one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Figure 10:
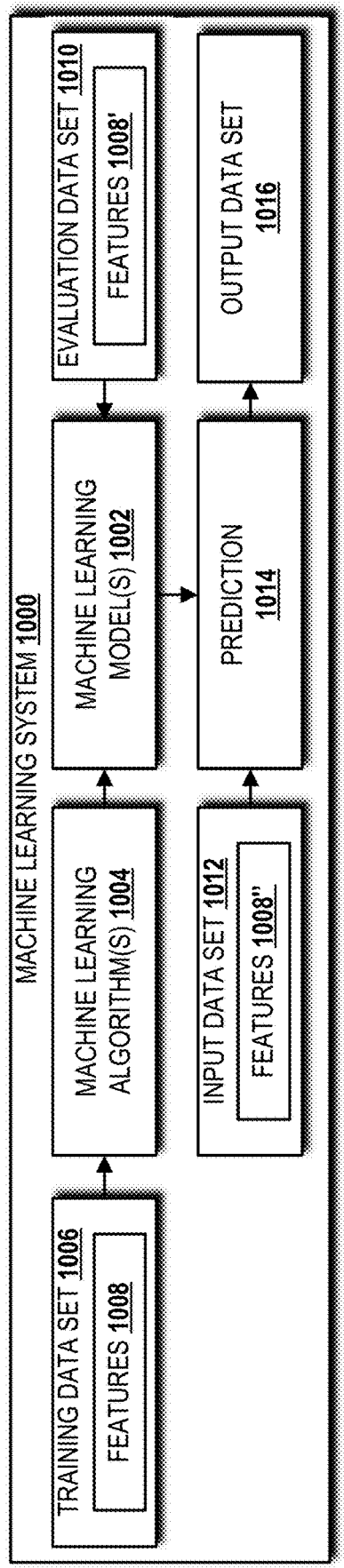
FIG. 10 is a diagram illustrating an illustrative machine learning system capable of implementing aspects of the concepts and technologies disclosed herein.

Turning now to FIG. 10, a machine learning system 1000 capable of implementing aspects of the embodiments disclosed herein will be described. In some embodiments, the sequence manager 110 110 and/or the sequence emulator 114 can be configured to utilize the machine learning system 1000. The illustrated machine learning system 1000 includes one or more machine learning models 1002. The machine learning models 1002 can include supervised and/or semi-supervised learning models. The machine learning model(s) 1002 can be created by the machine learning system 1000 based upon one or more machine learning algorithms 1004. The machine learning algorithm(s) 1004 can be any existing, well-known algorithm, any proprietary algorithms, or any future machine learning algorithm. Some example machine learning algorithms 1004 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1004 based upon the problem(s) to be solved by machine learning via the machine learning system 1000.

The machine learning system 1000 can control the creation of the machine learning models 1002 via one or more training parameters. In some embodiments, the training parameters are selected modelers at the direction of an enterprise, for example. Alternatively, in some embodiments, the training parameters are automatically selected based upon data provided in one or more training data sets 1006. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1004 converges to the optimal weights. The machine learning algorithm 1004 can update the weights for every data example included in the training data set 1006. The size of an update is controlled by the learning rate. A learning rate that is too high might prevent the machine learning algorithm 1004 from converging to the optimal weights. A learning rate that is too low might result in the machine learning algorithm 1004 requiring multiple training passes to converge to the optimal weights.

The model size is regulated by the number of input features ("features") 1006 in the training data set 1006. A greater the number of features 1008 yields a greater number of possible patterns that can be determined from the training data set 1006. The model size should be selected to balance the resources (e.g., compute, memory, storage, etc.) needed for training and the predictive power of the resultant machine learning model 1002.

The number of training passes indicates the number of training passes that the machine learning algorithm 1004 makes over the training data set 1006 during the training process. The number of training passes can be adjusted based, for example, on the size of the training data set 1006, with larger training data sets being exposed to fewer training passes in consideration of time and/or resource utilization. The effectiveness of the resultant machine learning model 1002 can be increased by multiple training passes.

Data shuffling is a training parameter designed to prevent the machine learning algorithm 1004 from reaching false optimal weights due to the order in which data contained in the training data set 1006 is processed. For example, data provided in rows and columns might be analyzed first row, second row, third row, etc., and thus an optimal weight might be obtained well before a full range of data has been considered. By data shuffling, the data contained in the training data set 1006 can be analyzed more thoroughly and mitigate bias in the resultant machine learning model 1002.

Regularization is a training parameter that helps to prevent the machine learning model 1002 from memorizing training data from the training data set 1006. In other words, the machine learning model 1002 fits the training data set 1006, but the predictive performance of the machine learning model 1002 is not acceptable. Regularization helps the machine learning system 1000 avoid this overfitting/memorization problem by adjusting extreme weight values of the features 1008. For example, a feature that has a small weight value relative to the weight values of the other features in the training data set 1006 can be adjusted to zero.

The machine learning system 1000 can determine model accuracy after training by using one or more evaluation data sets 1010 containing the same features 1008' as the features 1008 in the training data set 1006. This also prevents the machine learning model 1002 from simply memorizing the data contained in the training data set 1006. The number of evaluation passes made by the machine learning system 1000 can be regulated by a target model accuracy that, when reached, ends the evaluation process and the machine learning model 1002 is considered ready for deployment.

After deployment, the machine learning model 1002 can perform a prediction operation ("prediction") 1014 with an input data set 1012 having the same features 1008" as the features 1008 in the training data set 1006 and the features 1008' of the evaluation data set 1010. The results of the prediction 1014 are included in an output data set 1016 consisting of predicted data. The machine learning model 1002 can perform other operations, such as regression, classification, and others. As such, the example illustrated in FIG. 10 should not be construed as being limiting in any way.

Figure 11:
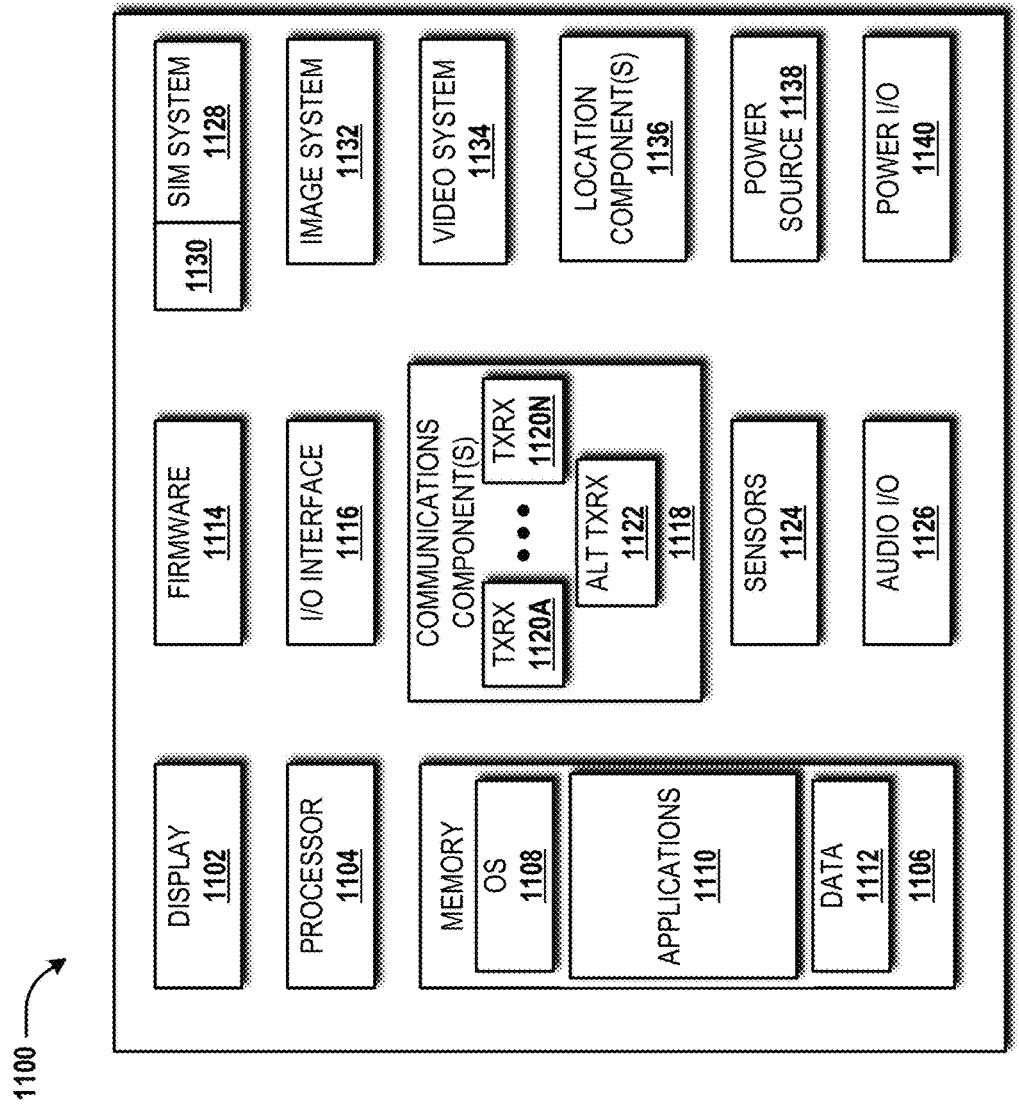
FIG. 11 is a block diagram illustrating an illustrative mobile device and components thereof capable of implementing aspects of the concepts and technologies disclosed herein.

Turning now to FIG. 11, an illustrative mobile device 1100 and components thereof will be described. In some embodiments, the monitored system 102, the verification server 118, one or more components thereof, is/are configured similar to or the same as the mobile device 1100. While connections are not shown between the various components illustrated in FIG. 11, it should be understood that some, none, or all of the components illustrated in FIG. 11 can be configured to interact with one another to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a display 1102 for displaying data. According to various embodiments, the display 1102 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110, other computer-executable instructions stored in the memory 1106, or the like. In some embodiments, the applications 1110 also can include a UI application (not illustrated in FIG. 11).

The UI application can interface with the operating system 1108 to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in entering/deleting data, entering and setting user IDs and passwords for device access, configuring settings, manipulating content and/or settings, multimode interaction, interacting with other applications 1110, and otherwise facilitating user interaction with the operating system 1108, the applications 1110, and/or other types or instances of data 1112 that can be stored at the mobile device 1100.

The applications 1110, the data 1112, and/or portions thereof can be stored in the memory 1106 and/or in a firmware 1114, and can be executed by the processor 1104. The firmware 1114 also can store code for execution during device power up and power down operations. It can be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data such as location information, presence status information, user IDs, passwords, and application initiation (start-up) requests. In some embodiments, the I/O interface 1116 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1100 can be configured to synchronize with another device to transfer content to and/or from the mobile device 1100. In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks, such as the network 120, the Internet, or some combination thereof. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments, one or more of the transceivers of the communications component 1118 may be configured to communicate GSM, CDMA, CDMAONE, CDMA2000, LTE, and various other 2G, 2.5G, 3G, 4G, 4.5G, 5G, and greater generation technology standards. Moreover, the communications component 1118 may facilitate communications over various channel access methods (which may or may not be used by the aforementioned standards) including, but not limited to, TDMA, FDMA, W-CDMA, OFDMA, SDMA, and the like.

In addition, the communications component 1118 may facilitate data communications using GPRS, EDGE, the HSPA protocol family HSDPA, EUL (also referred to as HSUPA, HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an Nth transceiver ("TxRx") 1120N that can operate in a second communications mode relative to the first transceiver 1120A (e.g., UMTS). While two transceivers 1120A-1120N (hereinafter collectively and/or generically referred to as "transceivers 1120") are shown in FIG. 11, it should be appreciated that less than two, two, and/or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, charge-coupled devices ("CCDs"), combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to an MMS message, email message, and sent to another device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a geographic location of the mobile device 1100. According to various embodiments, the location components 1136 can send and/or receive signals from global positioning system ("GPS") devices, assisted-GPS ("A-GPS") devices, WI-FI/WIMAX and/or cellular network triangulation data, combinations thereof, and the like. The location component 1136 also can be configured to communicate with the communications component 1118 to retrieve triangulation data for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can include a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140. Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1100 or other devices or computers described herein, such as the computer system 700 described above with reference to FIG. 7. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1100 in order to store and execute the software components presented herein. It is also contemplated that the mobile device 1100 may not include all of the components shown in FIG. 11, may include other components that are not explicitly shown in FIG. 11, or may utilize an architecture completely different than that shown in FIG. 11.

Based on the foregoing, it should be appreciated that aspects of zero day attack detection have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
monitoring, by a sequence manager executed by a processor of a system, a sequence of transaction requests received by the system, wherein the sequence of transaction requests includes a path from a root transaction to a destination transaction;
determining, by the sequence manager, that a transaction request in the sequence of transaction requests is anomalous, wherein determining that the transaction request in the sequence of transaction requests is anomalous includes determining that an area associated with the path from the root transaction to the destination transaction deviates from a baseline area corresponding to verified transaction requests associated with the root transaction and the destination transaction; and
in response to determining that the transaction request is anomalous,
quarantining, by the sequence manager, the transaction request to prevent the system from processing the transaction request, and
while the transaction request is quarantined and prevented from being processed by the system, providing, by the sequence manager, the sequence of transaction requests to a sequence emulator, wherein the sequence emulator attempts to verify an output of the sequence of transaction requests.

2. The method of claim 1, further comprising:
receiving, by the sequence manager, a notification from the sequence emulator that the output of the sequence of transaction requests cannot be verified; and
in response to the notification, instructing, by the sequence manager, the system to deny processing of the sequence of transaction requests.

3. The method of claim 2, further comprising updating, by the sequence manager, a database to include the sequence of transaction requests with a label indicating that the sequence of transaction requests is associated with a vulnerability.

4. The method of claim 1, further comprising:
receiving, by the sequence manager, a notification from the sequence emulator that the output of the sequence of transaction requests can be verified; and
in response to the notification, instructing, by the sequence manager, the system to allow processing of the sequence of transaction requests.

5. The method of claim 4, further comprising updating, by the sequence manager, a database to include the sequence of transaction requests with a label indicating that the sequence of transaction requests is not associated with a vulnerability.

6. The method of claim 1, wherein the sequence of transaction requests comprises a plurality of software transaction requests or a plurality of firmware transaction requests.

7. The method of claim 1, wherein the sequence of transaction requests comprises a plurality of hardware transaction requests.

8. The method of claim 1, wherein monitoring, by the sequence manager, the sequence of transaction requests comprises monitoring, by the sequence manager, the sequence of transaction requests via a probe, wherein the probe comprises a hardware probe or a software probe.

9. A system comprising:
a processor; and
a memory having instructions comprising a sequence manager stored thereon that, when executed by the processor, cause the sequence manager to perform operations comprising
monitoring a sequence of transaction requests received by the system, wherein the sequence of transaction requests includes a path from a root transaction to a destination transaction,
determining that a transaction request in the sequence of transaction requests is anomalous, wherein determining that the transaction request in the sequence of transaction requests is anomalous includes determining that an area associated with the path from the root transaction to the destination transaction deviates from a baseline area corresponding to verified transaction requests associated with the root transaction and the destination transaction, and
in response to determining that the transaction request is anomalous,
quarantining the transaction request to prevent the system from processing the transaction request, and
while the transaction request is quarantined and prevented from being processed by the system, providing the sequence of transaction requests to a sequence emulator, wherein the sequence emulator attempts to verify an output of the sequence of transaction requests.

10. The system of claim 9, wherein the operations further comprise:
receiving a notification from the sequence emulator that the output of the sequence of transaction requests cannot be verified; and
in response to the notification, instructing the system to deny processing of the sequence of transaction requests.

11. The system of claim 10, wherein the operations further comprise updating a database to include the sequence of transaction requests with a label indicating that the sequence of transaction requests is associated with a vulnerability.

12. The system of claim 9, wherein the operations further comprise:
receiving a notification from the sequence emulator that the output of the sequence of transaction requests can be verified; and
in response to the notification, instructing the system to allow processing of the sequence of transaction requests.

13. The system of claim 12, wherein the operations further comprise updating a database to include the sequence of transaction requests with a label indicating that the sequence of transaction requests is not associated with a vulnerability.

14. The system of claim 9, wherein the sequence of transaction requests comprises a plurality of software transaction requests, a plurality of hardware transaction requests, or a plurality of firmware transaction requests.

15. The system of claim 9, wherein the sequence of transaction requests comprises a plurality of hardware transaction requests.

16. The system of claim 9, wherein monitoring the sequence of transaction requests comprises monitoring the sequence of transaction requests via a probe, wherein the probe comprises a hardware probe or a software probe.

17. A computer-readable storage medium having computer-executable instructions comprising a sequence manager stored thereon that, when executed by a processor of a system, cause the sequence manager to perform operations comprising:

monitoring a sequence of transaction requests received by the system, wherein the sequence of transaction requests includes a path from a root transaction to a destination transaction;

determining that a transaction request in the sequence of transaction requests is anomalous, wherein determining that the transaction request in the sequence of transaction requests is anomalous includes determining that an area associated with the path from the root transaction to the destination transaction deviates from a baseline area corresponding to verified transaction requests associated with the root transaction and the destination transaction; and in response to determining that the transaction request is anomalous, quarantining the transaction request to prevent the system from processing the transaction request, and while the transaction request is quarantined and prevented from being processed by the system, providing the sequence of transaction requests to a sequence emulator, wherein the sequence emulator attempts to verify an output of the sequence of transaction requests.

18. The computer-readable storage medium of claim 17, wherein the operations further comprise:

receiving a notification from the sequence emulator that the output of the sequence of transaction requests cannot be verified;

in response to the notification, instructing the system to deny processing of the sequence of transaction requests; and updating a database to include the sequence of transaction requests with a label indicating that the sequence of transaction requests is associated with a vulnerability.

19. The computer-readable storage medium of claim 17, wherein the operations further comprise:

receiving a notification from the sequence emulator that the output of the sequence of transaction requests can be verified;

in response to the notification, instructing the system to allow processing of the sequence of transaction requests; and updating a database to include the sequence of transaction requests with a label indicating that the sequence of transaction requests is not associated with a vulnerability.

20. The computer-readable storage medium of claim 17, wherein monitoring the sequence of transaction requests comprises monitoring the sequence of transaction requests via a probe, wherein the probe comprises a hardware probe or a software probe.

\* \* \* \* \*